(12) United States Patent
Kim et al.

(10) Patent No.: US 7,486,600 B2
(45) Date of Patent: Feb. 3, 2009

(54) RECORDING MEDIUM, METHOD OF CONFIGURING CONTROL INFORMATION THEREOF, RECORDING AND/OR REPRODUCING METHOD USING THE SAME, AND APPARATUS THEREOF

(75) Inventors: Jin Yong Kim, Seongnam-si (KR); Young Kuk Kim, Osan-si (KR)

(73) Assignee: LG Electronics Inc., Seoul (KR)

( * ) Notice: Subject to any disclaimer, the term of this patent is extended or adjusted under 35 U.S.C. 154(b) by 683 days.

(21) Appl. No.: 10/883,668

(22) Filed: Jul. 6, 2004

(65) Prior Publication Data
US 2005/0007923 A1    Jan. 13, 2005

(30) Foreign Application Priority Data
Jul. 8, 2003    (KR)    ............. 10-2003-0046146

(51) Int. Cl.
G11B 7/24    (2006.01)
(52) U.S. Cl. .............. 369/53.22; 369/47.28; 369/59.25; 369/53.37
(58) Field of Classification Search ........... 369/53.2, 369/53.26, 53.16, 53.37, 47.27, 47.28, 59.25, 369/47.25, 47.3, 47.1, 53.25
See application file for complete search history.

(56) References Cited

U.S. PATENT DOCUMENTS

| | | | | | |
|---|---|---|---|---|---|
| 4,866,672 | A | * | 9/1989 | Terao et al. ................ | 369/194 |
| 5,753,413 | A | * | 5/1998 | Nishida et al. ......... | 430/270.13 |
| 6,160,769 | A | * | 12/2000 | Ohnuki et al. ........... | 369/13.13 |
| 6,197,399 | B1 | * | 3/2001 | Naito et al. ................ | 428/64.1 |
| 6,217,968 | B1 | * | 4/2001 | Maro et al. ................ | 428/64.1 |
| 2002/0048646 | A1 | | 4/2002 | Tomura et al. | |
| 2003/0007448 | A1 | * | 1/2003 | Kamezaki et al. ......... | 369/275.4 |
| 2003/0193882 | A1 | * | 10/2003 | Suenaga et al. .......... | 369/275.4 |

FOREIGN PATENT DOCUMENTS

| | | | |
|---|---|---|---|
| CN | 1318840 | A | 10/2001 |
| EP | 968769 | | 1/2000 |
| EP | 1128383 | | 8/2001 |
| EP | 1128383 | A2 * | 8/2001 |
| EP | 1172810 | | 1/2002 |

OTHER PUBLICATIONS

PCT International Search Report, dated Sep. 16, 2004.
Taiwanese Office Action dated Dec. 11, 2006 with English Translation.
Chinese Office Action dated Jun. 15, 2007.

* cited by examiner

*Primary Examiner*—Wayne R Young
*Assistant Examiner*—Thomas D Alunkal
(74) *Attorney, Agent, or Firm*—Harness, Dickey & Pierce, P.L.C.

(57) ABSTRACT

The present invention provides a record media, and more particularly, to a method of recording disc identification information within a management area of a recordable optical disc and an optical disc recording/reproducing method using the same. In recording optical disc identification information within a disc management area, the present invention includes recording a media type identification information identifying a type of a record media of an optical disc and a disc manufacturer identification information identifying a manufacturer of the optical disc, respectively. Accordingly, the present invention provides various specified methods of recording disc identification information within a management area in a high-density optical disc, thereby enabling to efficiently cope with the recording/reproducing of the optical disc using the recorded identification information.

29 Claims, 7 Drawing Sheets

RECORDING MEDIUM, METHOD OF CONFIGURING CONTROL INFORMATION THEREOF, RECORDING AND/OR REPRODUCING METHOD USING THE SAME, AND APPARATUS THEREOF

This application claims the benefit of the Korean Application No. 10-2003-0046146 filed on Jul. 8, 2003 which is hereby incorporated by reference.

BACKGROUND OF THE INVENTION

1. Field of the Invention

The present invention relates to a record medium, such as an optical disc, more particularly to a method of recording disc identification information within a management area of a recordable optical disc and an optical disc recording/reproducing method using the same.

2. Discussion of the Related Art

A high density optical recording medium, known as HD-DVD, is widely used to record and store high-definition video data and high-quality audio data. The Blu-ray disc represents next-generation HD-DVD technology. Technological specifications are now being established for the global standardization of the Blu-ray disc, including standards for a write-once Blu-ray disc(BD-WO. , a rewritable Blu-ray disc (BD-RE), and a Read-only Blu-ray disc(BD-ROM).

Specifically, a recordable optical disc is very sensitive to a media of a recording layer. Hence, a conventional recordable optical disc, e.g., write-once disc such as CD-R, DVD-R, and the like, uses an organic dye as a record media. A surface of the organic dye melts into a pit on recording. A portion of the organic dye having the pit differs from other portions failing to have the pit in reflexibility and the like, whereby a recorded signal can be detected from the record media. Moreover, metal is combined with cyanine as a sort of organic dye to produce phthalocyanine that is more stable to be widely used.

In viewpoint of a disc manufacturer manufacturing recordable optical discs, a record media of disc manufacturer's disc is correctly delivered to a user. Hence, the user confirms a disc manufacturer, optimal write power fitting a record media type, and the like and preferably utilizes the checked information in recording/reproducing.

Therefore, it is necessary to provide information about various record media types and a specific disc manufacturer to a user.

SUMMARY OF THE INVENTION

Accordingly, the present invention is directed to a method of recording disc identification information in an optical disc that substantially obviates one or more problems due to limitations and disadvantages of the related art.

An object of the present invention is to provide a new method of recording disc identification information as specified information, by which recording/reproducing of an optical disc is efficiently performed from the recorded disc identification information.

Another object of the present invention is to provide a specified method of recording record media identification information and disc manufacturer's identification information in a specific area within a disc, by which reciprocal compatibility is provided between the same based discs.

A further object of the present invention is to provide a recording/reproducing method and apparatus thereof, by which data is efficiently recorded/reproduced on/from an optical disc using the recorded disc identification information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in recording optical disc identification information within a disc management area, an optical disc identification information recording method according to the present invention includes the step of recording a media type identification information identifying a type of a record media of an optical disc and a disc manufacturer identification information identifying a manufacturer of the optical disc, respectively.

In another aspect of the present invention, an optical disc includes g a management area wherein a media type identification information identifying a type of a record media of the optical disc is recorded in the management area to identify whether the record media is an organic dye or an inorganic dye.

In another aspect of the present invention, an optical disc includes a management area wherein a media type identification information identifying a type of a record media of the optical disc and a disc manufacturer identification information identifying a disc manufacturer of the optical disc are recorded in the management area.

In another aspect of the present invention, a recording/reproducing method of an optical disc includes the steps of, if the optical disc loaded, deciding a type of the optical disc from a record media identification information and disc manufacturer information recorded within a management area of the optical disc and adjusting a write strategy and/or reproducing strategy according to a result of the deciding step.

In another aspect of the present invention, an optical disc recording/reproducing apparatus includes a control unit delivering a recording or reproducing command and a recorder/reproducer receiving the write command, the recorder/reproducer performing a recording or reproducing according to the recording or reproducing command in a manner of reading a disc information recorded within a management area of an optical disc and an optical disc identification information recorded within the disc information and performing the recording or reproducing according to the optical disc identification information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. For convenience of explanation, a Blu-ray disc (BD) is taken as an example of an optical disc according to the present invention. Yet, it is apparent that the concept of the present invention, which is characterized in an optical disc having its disc control information recorded thereon, is applicable to DVD-RAM/-RW/+RW/-R/+R and the like for example in the same manner.

Besides, although terms used in the present invention are possibly selected from the currently well-known ones, some terms are arbitrarily chosen by the applicant in some cases so that their meanings are explained in detail in the following description. Hence, the present invention should be understood with the intended meanings of the corresponding terms chosen by the applicant instead of the simple names or meanings of the terms themselves.

First of all, 'disc identification information' used in the description of the present invention means the information distinguishing a specific disc from other discs. As various discs then to show up lately, informations enabling to identify them, respectively are needed. Specifically, a recordable disc needs information identifying a recording layer type or number, information identifying a record media type, information identifying a disc manufacturer interoperating with them, etc.

Figure 1:
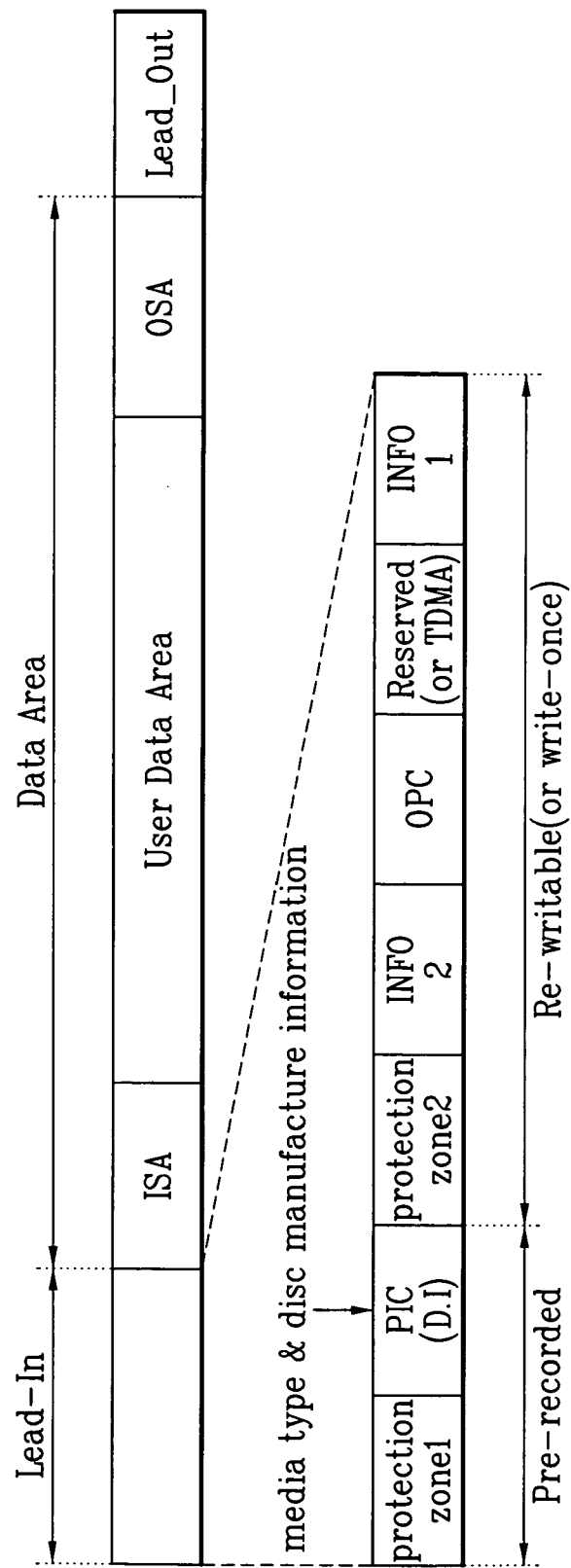
FIG. 1 is a diagram of a single-layer disc applicable to the present invention.

FIG. 1 is a structural diagram of an optical disc according to the present invention, in which a recordable optical disc is enough to be the optical disc applicable to the present invention. Yet, in the current technical viewpoint, a write-once optical disc specifically reacts sensitively to a recording layer type. Hence, the present invention is more applicable to a write-once disc such as BD-WO and the like.

FIG. 1 is a structural diagram of a single-layer disc having one recording layer according to the present invention.

Referring to FIG. 1, a lead-in area is provided as a management area on an inner circumference area of an optical disc, whereas a lead-out area is provided as a management area on an outer circumference area of the optical disc.

The prerecorded area is an area where data was already written on manufacturing the disc, whereby a user or system is unable to perform data writing on the prerecorded area at all. In BD-RE/WO, the prerecorded area is named PIC (permanent information and control data) area. And, the above-described disc information (hereinafter called 'DI') as information required for disc recording is recorded in the PIC area.

In a data area, provided are a user data area where user's real data is recorded and spare areas ISA and OSA to replace a generated defect area. Specifically, TDMA (temporary defect management area) for recording information of defect and general managements is provided to such a write-once optical disc as BD-WO. In case of the re-writable BD (BD-RE), TDMA is unnecessary so that such an area is left as a reserved area.

In the description of the present invention, 'disc control information' means an area including various information for disc record playback or information for disc record playback. And, the disc control information is commonly designated information provided to a prerecorded area within a disc or to an embossed area for a disc user by a disc manufacturer. Yet, the disc control information is provided not only to the prerecorded area but also to a recordable area. The disc information within the prerecorded or embossed area can be copied to the recordable area as well. And, they are just exemplary.

For instance, the disc control information is called 'disc information' in BD or 'physical format information' in DVD-RAM/-RW/+RW/-R/+R.

Hence, it is apparent that the technical background of the present invention be identically applicable to 'physical format information' in DVD-RAM/-RW/+RW/-R/+R. For convenience of explanation, 'disc information (hereinafter abbreviated DI)' corresponding to a case of Blu-ray disc (BD) is taken as an example.

The present invention is characterized in that various identification informations including record media identification information are recorded in a prerecorded or recordable area. The management information recorded in the prerecorded area is always read out to be taken into consideration for recording or playback. Hence, the prerecorded area is optimal to providing new record media identification information as specified information.

Specifically, the identification information could be prerecorded by a wobble pattern or pre-pit type in the related art manner. Yet, in case that the information was prerecorded on a common control area, e.g., lead-in area, to read out the information for reproducing as well as recording or in case that the information was prerecorded by the wobble pattern or pre-pit type, it is preferable that the information is copied to the lead-in area on data recording.

In case of BD-RE/WO, the PIC area as the prerecorded area is recorded by biphased high frequency modulated signals, the high frequency modulated signals in the corresponding area are played back according to a specific playback method, and information is acquired from the playback. Yet, it is a matter of course that a recording method of the prerecorded area should be differently applied according to a disc specification, e.g., DVD specification, CD specification, etc.

Figure 2:
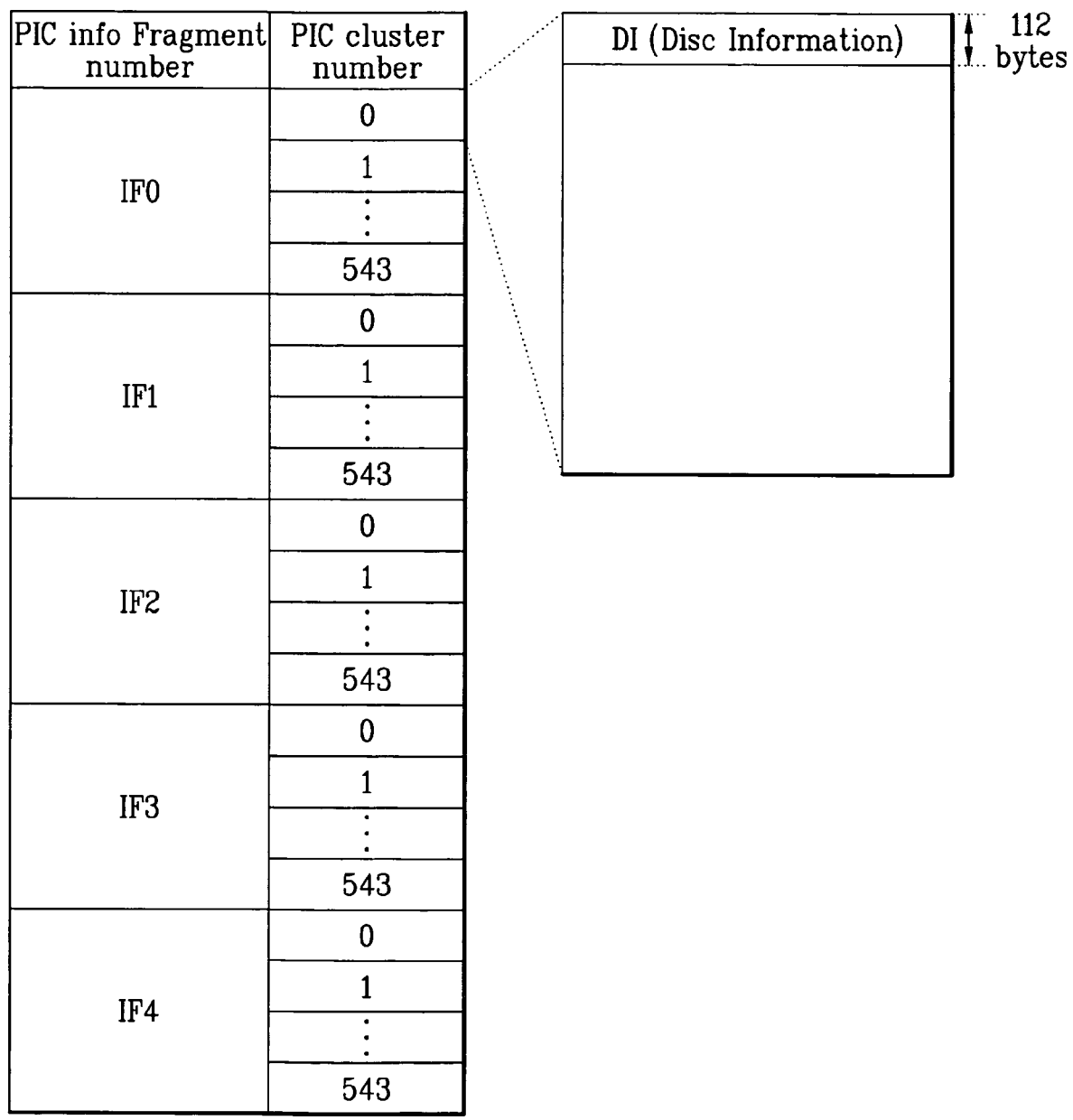
FIG. 2 is a diagram of a management area, in which where disc information including disc identification information of the present invention is recorded.

FIG. 2 is a structural diagram of a PIC area in the disc shown in FIG. 1. As mentioned in the foregoing description, it means that information can be rearranged like the structure of the PIC area in FIG. 2 when the entire information within the high frequency modulated PIC area is acquired.

A method of configuring disc information (DI) in the PIC area is explained in detail as follows.

In BD-RE/WO, 'one cluster' represents a minimum record unit, five hundred forty-four clusters gather to construct one fragment as one upper record unit, and total five fragments gather to form the PIC area. Disc information is recorded in a front head cluster of a first fragment IFO. The disc information is plurally recorded per recording layer and writing speed permitted by the corresponding optical disc, and one disc information includes 112 bytes. Specifically, disc information constructed with 112-bytes is called disc information (DI) frame. Moreover, the same contents of the disc information are repeatedly recorded in each front head cluster of the rest of the fragments, thereby enabling to cope with loss of the disc information.

Information representing the corresponding recording layer, information representing writing speed, and write strategy information corresponding to the writing speed are recorded within each disc information. Moreover, record media identification information and disc manufacturer information are recorded within each disc information as well. Hence, such information is utilized in the recording or reproducing of the corresponding optical disc, thereby enabling to provide optimal write power per recording layer and per writing speed.

Various embodiments for a method of recording disc identification information within disc information and for a recording/reproducing method using the same according to the present invention are explained in detail by referring to FIGS. 3 to 8 as follows.

Figure 3:
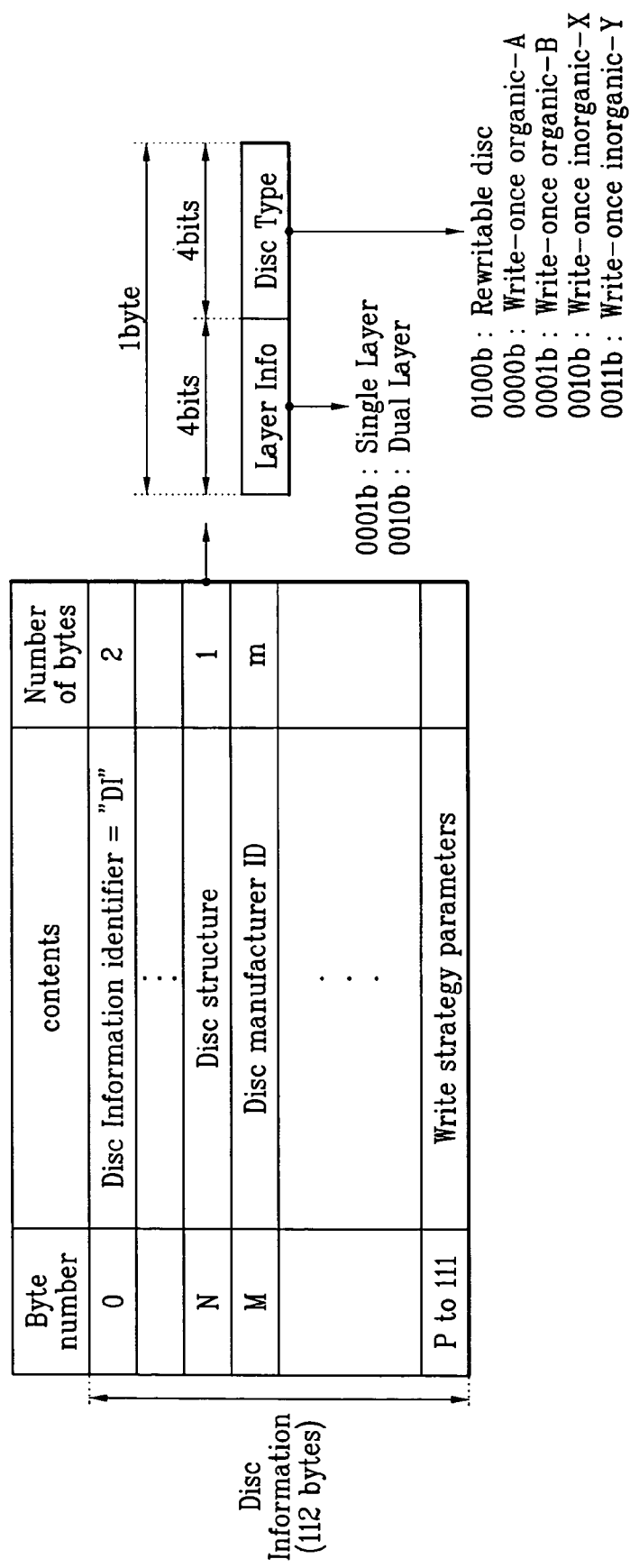
FIG. 3 is a diagram of recording disc identification information according to a first embodiment of the present invention.

FIG. 3 shows a disc information structure corresponding to a method of recording optical disc identification information according to a first embodiment of the present invention.

Referring to FIG. 3, 'Disc structure' field for recording information of disc structure therein is allocated to $N^{th}$ byte within disc information. The first embodiment according to the present invention relates to a method of recording record media identification information using the $N^{th}$ byte.

Specifically, 1-byte of 'Disc structure' field is divided into first 4-bits and second 4-bits so that 'recording layer information (Layer Info)' and 'disc type information (Disc Type)' are recorded in the first and second 4-bits, respectively. If there exist two recording layers in a disc, '0001b' of the 'recording layer information (Layer Info)' is defined to mean a single layer or '0010b' of the 'recording layer information (Layer Info)' is defined to mean a dual layer, for example. The specific bit arrangement proposed by the present invention is exemplarily proposed for convenience of explanation. And, it is apparent that different bit arrangement can be adopted by the same concept. For instance, it can be also defined that '1001b' and '1010b' mean a single layer and dual layer, respectively. This can be identically applied unless a special meaning is given to all bit arrangements that will be explained later.

And, 'Disc Type' information is recorded in the second 4-bits of the 'Disc structure' field, which enables to distinguish whether the optical disc is a rewritable disc or a write-once disc. For instance, if the information is '01XXb', it means the rewritable disc. If the information is '00XXb', it means the write-once disc. Specifically, information identifying a record media is given thereto in case of the recordable disc, i.e., write-once disc.

The record media identification information can indicate an organic dye and an inorganic dye. If the corresponding information is '000Xb', it designates the organic dye. If the corresponding information is '001Xb', it designates the inorganic dye. In case of designating a specific material of the organic dye, e.g., if a cyanine material (e.g., type-A material) is designated, '0000b' is allocated thereto. If a phthalocyanine material (e.g., type-B material) is designated, '0001b' is allocated thereto. Likewise, in case of designating a specific material of the inorganic dye, e.g., if a $SnO_xN_y$ material (e.g., type-X material) is designated, '0010b' is allocated thereto. If a Te—O—Pd material (e.g., type-Y material) is designated, '0011b' is allocated thereto. Various kinds of the organic and inorganic materials exist, which are distinguished from each other by the identification information according to the present invention. Specifically, when 'Disc structure' field is recorded in $12^{th}$ byte by 'N=12' in the first embodiment of the present invention, it is able to record the requested record media identification information without modifying the structure of the conventional 1× speed BD-RE disc information.

Moreover, 'Disc manufacturer ID' field providing information about a disc manufacturer having manufactured the corresponding disc is provided to another specific area of the disc information, e.g., $M^{th}$ byte, disc manufacturer's name is recorded in the corresponding field according to a specified format. For instance, the recording is can be performed according to the ISO646 character set.

Generally, a record media type is determined according to disc manufacturer's selection. As the record media identification information recorded in the $N^{th}$ byte is directly related to the corresponding manufacturer, 'Disc manufacturer ID' enabling to recognize a disc manufacturer is separately recorded within the disc information to indicate that the corresponding manufacturer has selected a type of a specific record media to manufacture a disc.

Hence, it is able to utilize the combination of the record media identification information of the Nth byte and the disc manufacturer information of the Mth byte as information for providing unique x characteristics of each disc.

Figure 4:
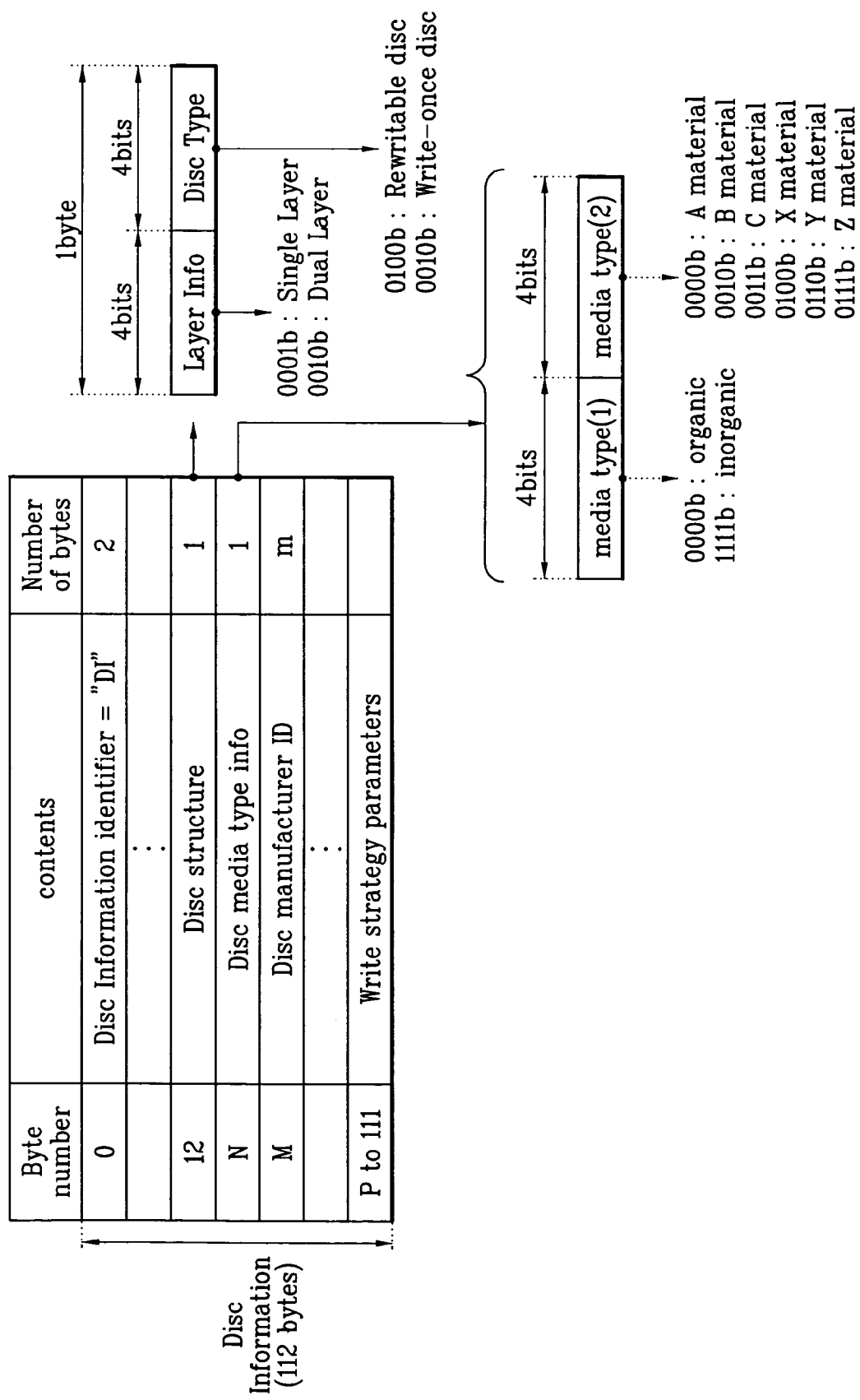
FIG. 4 is a diagram of recording disc identification information according to a second embodiment of the present invention.

FIG. 4 shows a disc information structure corresponding to a method of recording optical disc identification information according to a second embodiment of the present invention.

Referring to FIG. 4, 'recording layer information (Layer Info)' and 'Disc Type' information are record in 'Disc structure' field that is $12^{th}$ field within disc information. The 'Disc Type' information distinguishes whether the corresponding disc is a rewritable disc or a write-once disc only, and the information for distinguishing record media identification information is recorded in $N^{th}$ byte.

And, the $N^{th}$ byte can be named 'disc media type info' field as identification information identifying a record media. The $N^{th}$ byte is divided into first 4-bits and second 4-bits to be classified into $1^{st}$ identification information (media type-1) and $2^{nd}$ identification information (media type-2). The $1^{st}$ identification information identifies an organic or inorganic dye, and the $2^{nd}$ identification information identifies a used material such as material-A, material-B, material-C, material-X, material-Y, and material-Z.

Thus, the record media identification information is recorded to actively cope with extension of the record media later, which enables to identify other dyes instead of the organic and inorganic dyes via the $1^{st}$ identification information (represented by 4-bits to identify maximum sixteen record media) and to identify maximum sixteen record media materials represented by 4-bits each.

Moreover, 'Disc manufacturer ID' field providing identification information about a disc manufacturer having manufactured the corresponding disc is provided to another specific area within the disc information, e.g., $M^{th}$ byte, which is identically applied and utilized like the case of FIG. 4.

Figure 5:
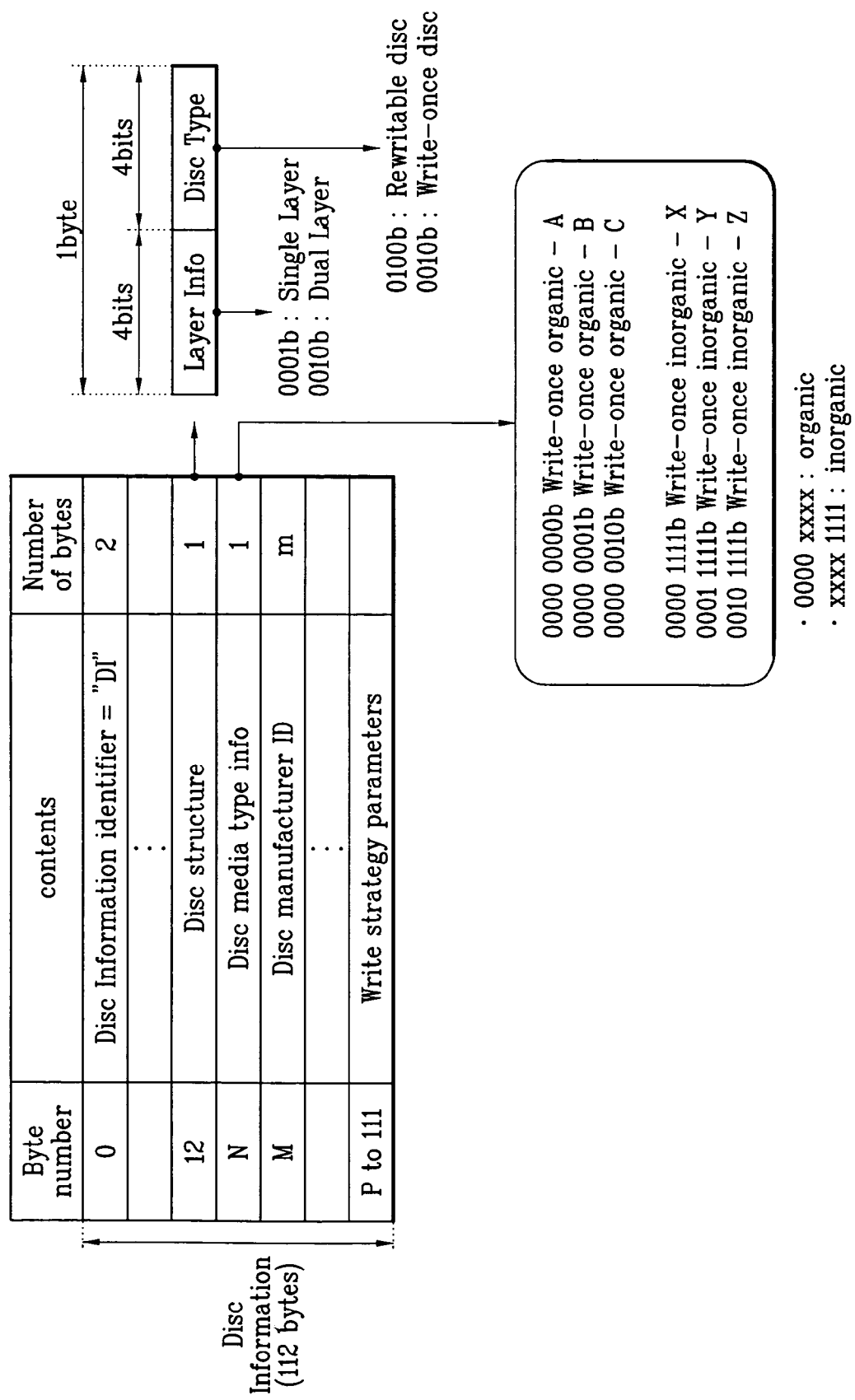
FIG. 5 is a diagram of recording disc identification information according to a third embodiment of the present invention.

FIG. 5 shows a disc information structure corresponding to a method of recording optical disc identification information according to a third embodiment of the present invention, in which the same $N^{th}$ byte of the second embodiment is separately allocated to distinguish record media identification information and in which contents of $12^{th}$ byte are the same contents of the second embodiment of the present invention.

Referring to FIG. 5, in viewpoint of a concrete bit arrangement, '0000 XXXXb' is used as information of identifying a material of an organic dye and 'XXXX 1111b' is used as information of identifying a material of an inorganic dye.

For instance, '0000 0000b' is allocated to the cyanine material of organic dye, e.g., type-A material. And, '0000 1111b' is allocated to the $SnO_xN_y$ material of organic dye, e.g., type-X material. And, the third embodiment according to the present invention can actively cope with the extension of a selection range of record media later.

Moreover, 'Disc manufacturer ID' field providing identification information about a disc manufacturer having manufactured the corresponding disc is provided to another specific area within the disc information, e.g., $M^{th}$ byte, which is identically applied and utilized like the case of FIG. 4.

Figure 6:
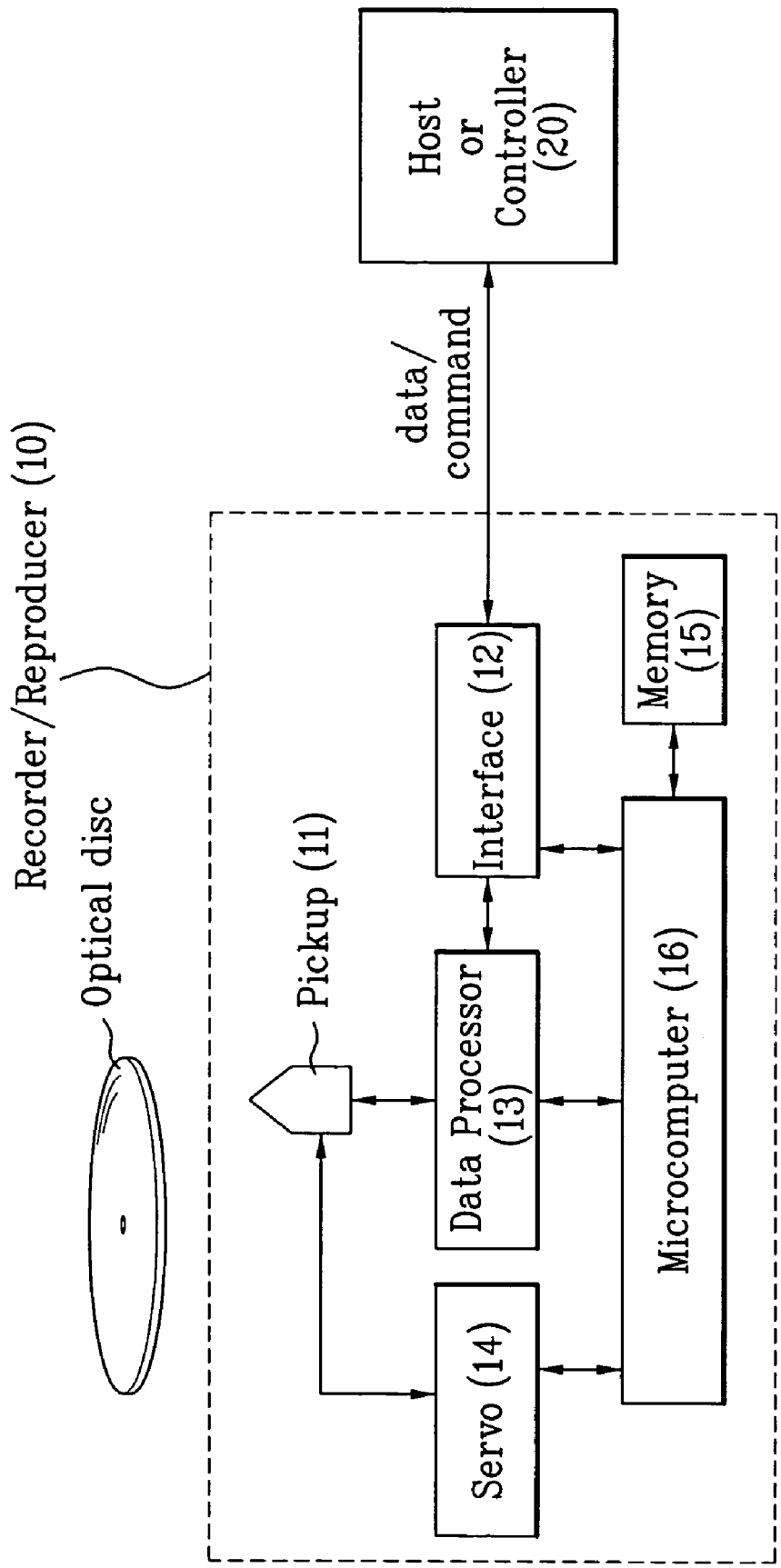
FIG. 6 is a block diagram of an optical disc recording/reproducing apparatus using disc identification information according to the present invention.

FIG. 6 is a block diagram of an optical disc recording/reproducing apparatus using disc identification information according to the present invention.

Referring to FIG. 6, a recording/reproducing apparatus according to the present invention includes a recorder/reproducer 10 carrying out recording/reproducing on an optical disc and a control unit 20 controlling the recorder/reproducer 10.

The control unit 20 gives a record or playback command for a specific area, and the recorder/reproducer 10 caries out the recording/reproducing on the specific area according to the command of the control unit 20. Specifically, the recorder/reproducer 10 includes an interface unit 12 performing communications with an external device, a pickup unit 11 directly recording data on the optical disc or reproducing the data, a data processor 13 receiving a playback signal from the pickup unit 11 to restore into a necessary signal value or modulating to deliver a signal to be recorded into a signal to be recorded on the optical disc, a servo unit 14 reading out a signal from the optical disc correctly or controlling the pickup unit 11 to record a signal on the optical disc correctly, a memory 15 temporarily storing management information including disc control information and data, and a microcomputer 16 responsible for controlling the above-described elements within the recorder/reproducer 10.

Besides, in case that the apparatus fails to include the control unit 20, the microcomputer 16 enables to perform the functions of the control unit 20.

A recording process of an optical disc according to the present invention is explained in detail by referring to FIG. 6 and FIG. 7 as follows.

First of all, once an optical disc is loaded in the recording/reproducing apparatus, the entire disc management information within the disc is read out to be temporarily stored in the memory 15 of the recorder/reproducer 10. And, various kinds of the disc management information are utilized for the recording/reproducing of the optical disc.

Specifically, the management information stored in the memory 15 includes disc information of the present invention. Hence, the record media identification information and disc manufacturer identification information recorded within the disc information are read out to be temporarily stored in the memory 15. The microcomputer 16 enables to decide whether the record media of the corresponding optical disc is the organic or inorganic dye from the read out identification information as well as what kind of a material is used for the corresponding dye, thereby adjusting write parameters appropriately.

For instance, the adjusted write parameters are a sort of a write strategy and include optimal write power, a start time point of a write pulse for write power control, and the like. After completion of adjusting the write parameters, the recording/reproducing apparatus is ready for recording. If intending to perform a recording on a specific area within the optical disc, the control unit 20 renders such an intent into a writing command and then delivers it to the recorder/reproducer 10 together with data to be recorded. After receiving the writing command, the microcomputer 16 performs the writing command using the adjusted write parameters.

A reproducing process of an optical disc according to the present invention is explained in detail by referring to FIG. 6 and FIG. 8 as follows.

First of all, once an optical disc is loaded in the recording/reproducing apparatus, the entire disc management information within the disc is read out to be temporarily stored in the memory 15 of the recorder/reproducer 10. And, various kinds of the disc management information are utilized for the recording/reproducing of the optical disc. Specifically, the management information stored in the memory 15 includes disc information of the present invention. Hence, the record media identification information and disc manufacturer information recorded within the disc information are read out to be temporarily stored in the memory 15.

Accordingly, the microcomputer 16 enables to decide whether the record media of the corresponding optical disc is the organic or inorganic dye from the read out identification information as well as what kind of a material is used for the corresponding dye, thereby adjusting reproducing parameters appropriately. For instance, the adjusted reproducing parameters include gain adjustment of the servo 14 to compensate reflexibility and the like differing according to the record media. After completion of adjusting the reproducing parameters, the recording/reproducing apparatus is ready for reproducing. If intending to perform a recording on a specific area within the optical disc, the control unit 20 renders such an intent into a reproducing command and then delivers it to the recorder/reproducer 10. After receiving the writing command, the microcomputer 16 performs the reproducing command using the adjusted reproducing parameters.

Figure 7:
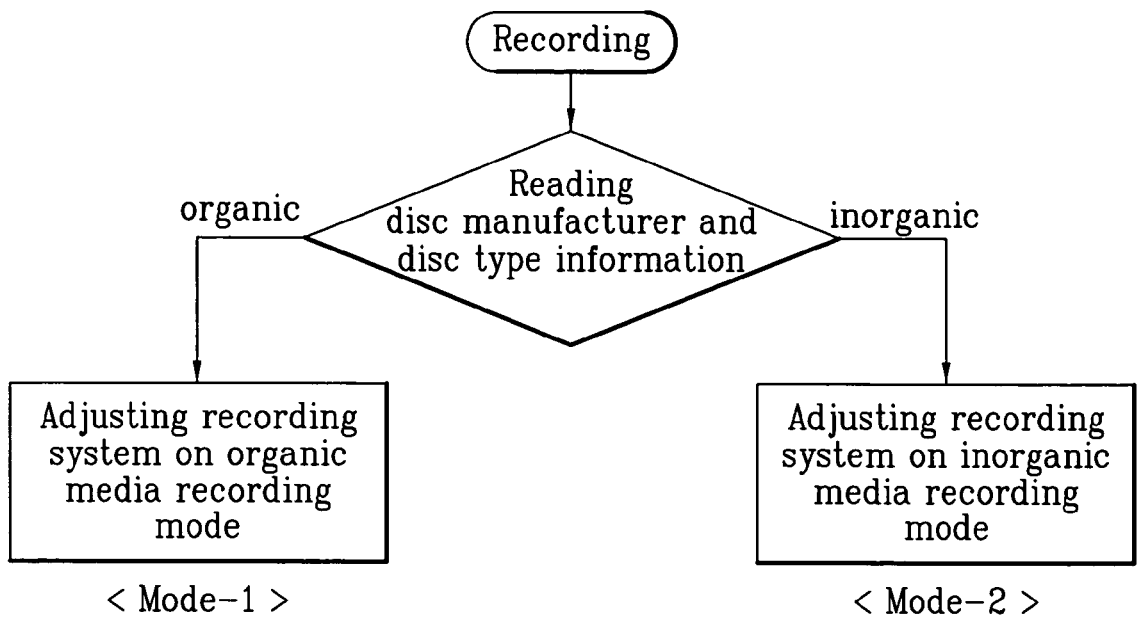
FIG. 7 is a flowchart of a optical disc recording method using disc identification information according to the present invention.
Figure 8:
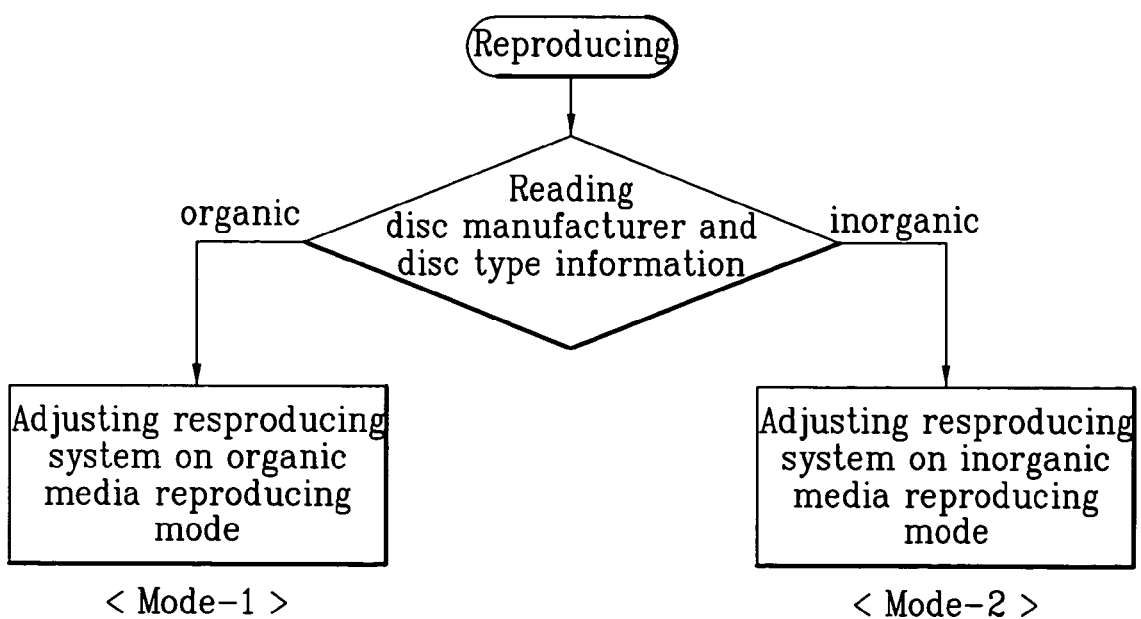
FIG. 8 is a flowchart of a optical disc recording method using disc identification information according to the present invention.

Through FIGS. 6 to 8, the recording and reproducing processes are separately explained in the above description for convenience of explanation. Substantially, once the optical disc is loaded, the write parameters (write strategy information, etc.) and reproducing parameters from the record media identification information of the corresponding disc so that the recording or reproducing will be performed according to the command (for recording or reproducing) of the control unit.

Accordingly, the present invention provides various specified methods of recording disc identification information within a management area in a record media, and more particularly, in a high-density optical disc, thereby enabling to efficiently cope with the recording/reproducing of the optical disc using the recorded identification information.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for recording data on a recording medium, comprising:

recording a type information for identifying a type of the recording medium and a manufacturer information for identifying a manufacturer of the recording medium on a specific area of the recording medium, wherein the type information includes first type information and second type information, the first type information for specifically identifying whether the recording medium includes an organic dye or an inorganic dye in a first field separate from the second type information, the second type information for specifically identifying a material corresponding to the first type information in a second field separate from the first type information.

2. The method of claim 1, wherein the second type information identifies whether the material is cyanine material or phthalocyanine material when the first type information identifies the organic dye.

3. The method of claim 1, wherein the second type information identifies whether the material is $SnO_xN_y$ material or Te—O—Pd material when the first type information identifies the inorganic dye.

4. A computer readable medium, comprising:
first type information recorded in a specific area of the computer readable medium, and the first type information for specifically identifying whether the recording medium includes an organic dye or an inorganic dye in a first field separate from the second type information, and
second type information recorded in the specific area of the computer readable medium, and the second type information for specifically identifying a material corresponding to the first type information in a second field separate from the first type information.

5. The computer readable medium of claim 4, wherein the specific area is a pre-recorded area.

6. The computer readable medium claim 4, wherein the second type information identifies whether the material is cyanine material or phthalocyanine material when the first type information identifies the organic dye.

7. The computer readable medium of claim 4, wherein the second type information identifies whether the material is $SnO_xN_y$ material or Te—O—Pd material when the first type information identifies the inorganic dye.

8. The computer readable medium of claim 4, further comprising:
manufacturer information for identifying a manufacturer of the corresponding recording medium, the manufacturer information recorded in the specific area.

9. The computer readable medium of claim 8, wherein the first and second type information and the manufacturer information are used to identify the type of the recording medium 10. An optical disc, comprising:
a management area wherein a media type identification information for identifying a media type of the optical disc and a disc manufacturer identification information for identifying a manufacturer of the optical disc are recorded in the management area, wherein the media type identification information includes first type information and second type information, the first type information for specifically identifying whether the optical disc includes an organic dye or an inorganic dye in a first field separate from the second type information, the second type information for specifically identifying a material corresponding to the first type information in a second field separate from the first type information.

11. The optical disc of claim 10, wherein the second type information identifies whether the material is cyanine material or phthalocyanine material when the first type information identifies the organic dye.

12. The optical disc of claim 10, wherein the second type information identifies whether the material is $SnO_xN_y$ material or Te—O—Pd material when the first type information identifies the inorganic dye.

13. A method for recording or reproducing data on or from an optical recording medium, comprising:
identifying the optical recording medium from a media type identification information and a manufacturer information recorded within a specific area of the optical recording medium; and
controlling a recording or reproducing of data according to a result of the identifying step, wherein
the media type identification information includes first type information and second type information, the first type information for specifically identifying whether the optical recording medium includes an organic dye or an inorganic dye in a first field separate from the second type information, the second type information for specifically identifying a material corresponding to the first type information in a second field separate from the first type information.

14. The method of claim 13, wherein the controlling step controls a write power or a write pulse for the recording of data according to a result of the identifying step.

15. The method of claim 13, wherein the controlling step adjusts a recording mode according to a result of the identifying step.

16. The method of claim 15, wherein the controlling step adjusts a recording mode for the organic media as a result of the identifying step.

17. The method of claim 15, wherein the controlling step adjusts a recording mode for the inorganic media as a result of the identifying step.

18. The method of claim 13, wherein the controlling step controls a gain of a reproduced signal according to a result of the identifying step.

19. The method of claim 13, wherein the controlling step adjusts a reproducing mode according to a result of the identifying step.

20. The method of claim 19, wherein the controlling step adjusts a reproducing mode for the organic media as a result of the identifying step.

21. The method of claim 19, wherein the controlling step adjusts a reproducing mode for the inorganic media as a result of the identifying step.

22. An apparatus for recording or reproducing data on or from an optical recording medium, comprising:
an optical pickup configured to read control information recorded in a specific area of the optical recording medium or to record a control information within a specific area of the optical recording medium; and
a control unit, operatively coupled to the optical pickup, configured to identify the optical recording medium based on first information for indicating a media type of the optical recording medium and second information for indicating a manufacturer of the optical recording medium among the control information read from the pickup, and the control unit configured to control the optical pickup to record a data or to reproduce a data according to a result of identifying the optical recording medium, wherein the first information includes first type information and second type information, the first type information for specifically identifying whether the recording medium includes an organic dye or an inorganic dye in a first field separate from the second type information, the second type information for specifically identifying a material corresponding to the first type information in a second field separate from the first type information.

23. The apparatus of claim 22, wherein the control unit is configured to adjust an optical power or write pulse for the data recording according to the result of identifying the optical recording medium.

24. The apparatus of claim 22, wherein the control unit is configured to adjusts a gain of a reproducing signal for the data reproducing according to the result of identifying the optical recording medium.

25. The apparatus of claim 22, wherein the control unit is configured to identify a disc type of the optical recording medium based on disc information in the control information, the disc information for identifying whether the optical recording medium is a write once disc or not, and to identify the optical recording medium based on the first and second type information if the disc type is the write one disc, and the disc type information is recorded in separate position from the first and second type information.

26. The method of claim 1, further recording disc type information for identifying whether the recording medium is a write once disc or not, wherein the type information is recorded if the recording medium is the write once disc, and the disc type information is recorded in separate position from the type information.

27. The computer readable medium of claim 4, further comprising disc type information recorded in a specific area of the computer readable medium, the disc type information for identifying whether the disc type of the computer readable medium is a write one disc or not, wherein the first and second type information are recorded if the disc type is the write once disc, and the disc type information is recorded in separate position from the first and second type information.

28. The optical disc of claim 10, wherein the management area for storing disc type information, the disc type information for identifying whether the disc type of the computer readable medium is a write once disc or not, wherein the media type identification information comprising the first and second type information is recorded if the disc type is the write once disc, and the disc type information is recorded in separate position from the media type identification information.

29. The method of claim 13, further comprising identifying a disc type of the optical recording medium from disc type information recorded in a specific area of the optical recording medium, the disc type information for identifying whether the disc type is a write once disc or not, wherein the media type identification information is identified if the disc type is the write once disc, and the disc type information is recorded in separate position from the media type identification information.

\* \* \* \* \*